(12) United States Patent
Yates et al.

(10) Patent No.: US 9,430,897 B2
(45) Date of Patent: *Aug. 30, 2016

(54) SECURE TRANSFER OF DIGITAL OBJECTS

(75) Inventors: Christopher Yates, San Diego, CA (US); Eric Schmitter, San Diego, CA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 173 days.

This patent is subject to a terminal disclaimer.

(21) Appl. No.: 12/493,071

(22) Filed: Jun. 26, 2009

(65) Prior Publication Data

US 2009/0327723 A1 Dec. 31, 2009

Related U.S. Application Data

(63) Continuation of application No. PCT/US2008/056691, filed on Mar. 12, 2008, and a continuation-in-part of application No. 11/215,227, filed on Aug. 29, 2005, now Pat. No. 8,192,286.

(60) Provisional application No. 60/906,474, filed on Mar. 12, 2007, provisional application No. 60/673,042, filed on Apr. 19, 2005.

(51) Int. Cl.
*A63F 13/00* (2014.01)
*G07F 17/32* (2006.01)
(Continued)

(52) U.S. Cl.
CPC ............... *G07F 17/32* (2013.01); *A63F 13/57* (2014.09); *A63F 13/577* (2014.09); *A63F 13/60* (2014.09); *A63F 13/63* (2014.09); *G06Q 30/08* (2013.01); *A63F 13/55* (2014.09); *A63F 13/56* (2014.09);
(Continued)

(58) Field of Classification Search
CPC ...... A63F 13/577; A63F 13/60; A63F 13/63; A63F 13/55; A63F 13/56; A63F 13/57; A63F 2300/8017; A63F 2300/64
USPC .................................................. 463/6; 726/28
See application file for complete search history.

(56) References Cited

U.S. PATENT DOCUMENTS 6,119,229 A * 9/2000 Martinez et al. ............... 726/28
6,202,051 B1 3/2001 Woolston
(Continued)

FOREIGN PATENT DOCUMENTS

JP 2002-183469 A 6/2002
JP 2003-010552 A 1/2003
(Continued)

OTHER PUBLICATIONS

International Search Report and Written Opinion issued in International Patent Application No. PCT/US2005/45105 on Aug. 8, 2007.
(Continued)

*Primary Examiner* — William H McCulloch, Jr.
(74) *Attorney, Agent, or Firm* — Procopio, Cory, Hargreaves & Savitch, LLP

(57) ABSTRACT

Transferring a digital object, comprising: receiving a digital object; validating the received digital object according to predefined rules; building a description of the validated digital object; providing access to the description to select the validated, described digital object for transfer; and transferring the validated, described digital object.

23 Claims, 11 Drawing Sheets

(51) Int. Cl.
*A63F 13/577* (2014.01)
*A63F 13/60* (2014.01)
*A63F 13/63* (2014.01)
*A63F 13/57* (2014.01)
*G06Q 30/08* (2012.01)
*A63F 13/55* (2014.01)
*A63F 13/56* (2014.01)
*G06Q 10/06* (2012.01)
*G06Q 10/10* (2012.01)
*G06Q 20/04* (2012.01)
*G06Q 40/00* (2012.01)

(52) U.S. Cl.
CPC .... *A63F 2300/64* (2013.01); *A63F 2300/8017* (2013.01); *G06Q 10/06* (2013.01); *G06Q 10/10* (2013.01); *G06Q 20/04* (2013.01); *G06Q 40/00* (2013.01); *G07F 17/3255* (2013.01)

(56) References Cited

U.S. PATENT DOCUMENTS

| | | | |
|---|---|---|---|
| 6,279,112 B1* | 8/2001 | O'Toole et al. | 726/10 |
| 6,669,564 B1* | 12/2003 | Young et al. | 463/42 |
| 6,697,944 B1 | 2/2004 | Jones et al. | |
| 6,735,324 B1* | 5/2004 | McKinley et al. | 382/100 |
| 6,884,162 B2 | 4/2005 | Raverdy et al. | 463/1 |
| 6,955,605 B2* | 10/2005 | Young et al. | 463/42 |
| 7,024,375 B2* | 4/2006 | Chau | G06Q 20/04 705/24 |
| 7,409,061 B2* | 8/2008 | Newcombe | A63F 13/12 380/251 |
| 7,549,924 B2* | 6/2009 | Canessa et al. | 463/42 |
| 7,716,474 B2* | 5/2010 | Eriksson | G06F 21/125 380/201 |
| 7,828,655 B2* | 11/2010 | Uhlir et al. | 463/30 |
| 7,874,921 B2* | 1/2011 | Baszucki et al. | 463/43 |
| 7,967,678 B2* | 6/2011 | Dougherty et al. | 463/30 |
| 8,088,011 B2* | 1/2012 | Russell | G06F 11/0709 463/42 |
| 8,090,618 B1 | 1/2012 | Chu | |
| 8,131,993 B2* | 3/2012 | Kline et al. | 713/150 |
| 8,192,286 B2* | 6/2012 | Dhunjishaw et al. | 463/42 |
| 8,292,744 B2* | 10/2012 | Baszucki et al. | 463/43 |
| 8,756,530 B2* | 6/2014 | Nicol, II | A63F 13/35 715/848 |
| 8,799,168 B2* | 8/2014 | Dhunjishaw et al. | 705/57 |
| 2001/0056383 A1* | 12/2001 | Shuster | 705/27 |
| 2002/0068629 A1* | 6/2002 | Allen | A63F 13/12 463 |
| 2002/0068631 A1* | 6/2002 | Raverdy et al. | 463/42 |
| 2002/0072412 A1* | 6/2002 | Young et al. | 463/42 |
| 2002/0073043 A1* | 6/2002 | Herman et al. | 705/64 |
| 2002/0169706 A1* | 11/2002 | Chandra et al. | 705/37 |
| 2003/0032476 A1 | 2/2003 | Walker et al. | |
| 2003/0046221 A1 | 3/2003 | Hora | |
| 2004/0039655 A1* | 2/2004 | Chau | G06Q 20/04 705/26.1 |
| 2004/0043806 A1* | 3/2004 | Kirby et al. | 463/6 |
| 2004/0102248 A1* | 5/2004 | Young et al. | 463/42 |
| 2005/0033601 A1* | 2/2005 | Kirby et al. | 705/1 |
| 2005/0038707 A1* | 2/2005 | Roever et al. | 705/21 |
| 2005/0038724 A1 | 2/2005 | Roever et al. | |
| 2005/0044359 A1* | 2/2005 | Eriksson | G06F 21/125 713/165 |
| 2005/0143174 A1 | 6/2005 | Goldman et al. | |
| 2005/0192071 A1 | 9/2005 | Matsuno et al. | |
| 2005/0287925 A1* | 12/2005 | Proch et al. | 446/470 |
| 2006/0035692 A1* | 2/2006 | Kirby et al. | 463/6 |
| 2006/0234795 A1* | 10/2006 | Dhunjishaw et al. | 463/42 |
| 2006/0258447 A1* | 11/2006 | Baszucki et al. | 463/31 |
| 2007/0060315 A1 | 3/2007 | Park | |
| 2008/0147805 A1* | 6/2008 | Abecassis et al. | 709/206 |
| 2008/0228578 A1* | 9/2008 | Mashinsky | 705/14 |
| 2009/0023487 A1* | 1/2009 | Gilson et al. | 463/11 |
| 2009/0150423 A1* | 6/2009 | Spanton et al. | 707/102 |
| 2009/0318221 A1* | 12/2009 | Dhunjishaw et al. | 463/29 |
| 2009/0327723 A1* | 12/2009 | Yates et al. | 713/168 |
| 2010/0029380 A1* | 2/2010 | Rhoads et al. | 463/29 |
| 2014/0213371 A1* | 7/2014 | Jain | H04L 29/06034 463/42 |
| 2014/0304102 A1* | 10/2014 | Dhunjishaw et al. | 705/26.3 |

FOREIGN PATENT DOCUMENTS

| | | |
|---|---|---|
| JP | 2003-526833 A | 9/2003 |
| JP | 2004-086315 A | 3/2004 |
| JP | 2006-053809 A | 2/2006 |
| JP | 2006-218223 A | 8/2006 |
| KR | 10-2001-0112199 A | 12/2001 |
| KR | 10-2003-0097465 A | 12/2003 |
| KR | 10-2004-0032010 A | 4/2004 |
| KR | 10-2004-0043943 A | 5/2004 |
| KR | 10-2005-0029048 A | 3/2005 |
| KR | 10-2005-0059347 A | 6/2005 |
| KR | 10-2007-0010885 A | 1/2007 |
| WO | 2006/080772 A1 | 12/2005 |
| WO | 2006/112893 A | 10/2006 |

OTHER PUBLICATIONS

Castronova, E. Virtual Worlds: A First-Hand Account of Market and Society on the Cyberian Frontier. CESifo Working Paper No. 618 [online], Dec. 2001 [retrieved Apr. 18, 2007], Retrieved from the Internet: URL: <http://papers.ssm.com/sol3/papers.cfm?abstract_id=294828>.

International Search Report and Written Opinion issued in International Patent Application No. PCT/US2008/056691 on Aug. 5, 2008.

Nathan Pearce and Eric Schmitter, "Station Auctions Design Document," Sony Online Entertainment Inc., Version 2.00, Feb. 14, 2005.

Becker, "Real Cash for Virtual Goods," CNET News, Feb. 8, 2005, internet website: http://news.com.com/Real+cash+for+virtual+goods/2100-1043_3-5566704.html (4 pages).

Terdiman, "'Second Life' Membership Now Free," CNET News, Sep. 8, 2005, internet website: http://news.com.com/Second+Life+membership+now+free/2100-1043_3-5855481.html (1 page).

Columbia House, Columbia House Online, 1996, internet website: http://web.archive.org/web/19961223113506/http://www.columbiahouse.com/ (1 page).

Supplementary European Search Report issued in related European Patent Application No. 08743800.8, on Feb. 2, 2011, 4 pages.

EPO, "Notice from the European Patent Office dated Oct. 1, 2007 concerning business methods," Nov. 1, 2007, Official Journal of the European Patent Office, Munich, XP007905525, ISSN: 0170-9291, pp. 592-593.

International Search Report and Written Opinion issued in PCT/US2008/056691, mailed on Aug. 5, 2008, 6 pages.

International Search Report and Written Opinion issued in International patent Application No. PCT/US2008/056701 on Jan. 22, 2009.

Supplementary European Search Report issued in related European Patent Application No. 08799844.9 on Apr. 20, 2011, 7 pages.

Notice of Grounds for Refusal for Japanese Patent Application No. 2014-022424 mailed on Aug. 3, 2015 in 15 pages.

LSL Wiki: AssetPermissions, [online], 2006, [searched on Jul. 24, 2015], Internet < URL: http://lslwiki.net/lslwiki/wakka.php?wakka=AssetPermissions/show&time=2006-05-11+22%3A55%3A55 > in 4 pages.

* cited by examiner

SECURE TRANSFER OF DIGITAL OBJECTS

CROSS-REFERENCE TO RELATED APPLICATIONS

The present application claims priority pursuant to 35 U.S.C. §120 as a continuation application of co-pending PCT Application Serial No. PCT/US08/56691, filed Mar. 12, 2008 which claimed the benefit of priority of U.S. Provisional Patent Application Ser. No. 60/906,474, filed Mar. 12, 2007, entitled "Secure Transfer of Digital Objects". The present application is also a continuation-in-part application of co-pending U.S. patent application Ser. No. 11/215,227, filed on Aug. 29, 2005, entitled "System for Secure Transfer of Online Privileges", which claimed the benefit of priority of U.S. Provisional Patent Application Ser. No. 60/673,042, filed Apr. 19, 2005. The disclosures of the above-referenced patent applications are hereby incorporated by reference.

BACKGROUND

The present invention relates generally to digital objects, and more particularly to securely transferring digital objects between computing devices.

A user of a software application program may create content in the form of digital objects that would be useful or desirable to other users. The creator may wish to sell that digital object, or the right to use that digital object in an application, to another user willing to purchase the digital object from the creator. However, the purchaser would typically want some assurances that the digital object for sale has value.

SUMMARY

Embodiments of the present invention provide for transferring a digital object between client devices.

In one implementation, a method of transferring a digital object includes: receiving a digital object; validating the received digital object according to predefined rules; building a description of the validated digital object; providing access to the description to select the validated, described digital object for transfer; and transferring the validated, described digital object.

In another implementation, a system for transferring a digital object includes: a validation module to validate a digital object according to predefined rules; a description module to build a description of the validated digital object; an access module providing access to the description of the digital object to select the validated, described digital object for transfer; and a transfer module to transfer the validated, described digital object.

Other features and advantages of the present invention will become more readily apparent to those of ordinary skill in the art after reviewing the following detailed description and accompanying drawings.

BRIEF DESCRIPTION OF THE DRAWINGS

Various embodiments of the present invention, both as to its structure and operation, may be gleaned in part by studying the accompanying drawings, in which.

DETAILED DESCRIPTION

Implementations of the present invention provide for the transfer of digital objects between client devices using an online service. The transfer may be made in exchange for agreed upon payment. The payment may be financial, including real currency, or non-financial, e.g., using points in an online system, effected by adjusting point balances in online accounts. In one implementation, the transfer is secured to ensure that a buyer will receive the object and that a seller will receive a payment. The data comprising a digital object are protected by encryption to prevent the data from being manipulated without authorization. The data are validated so that only objects that are compliant with corresponding rules will be usable and available for sale or transfer.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
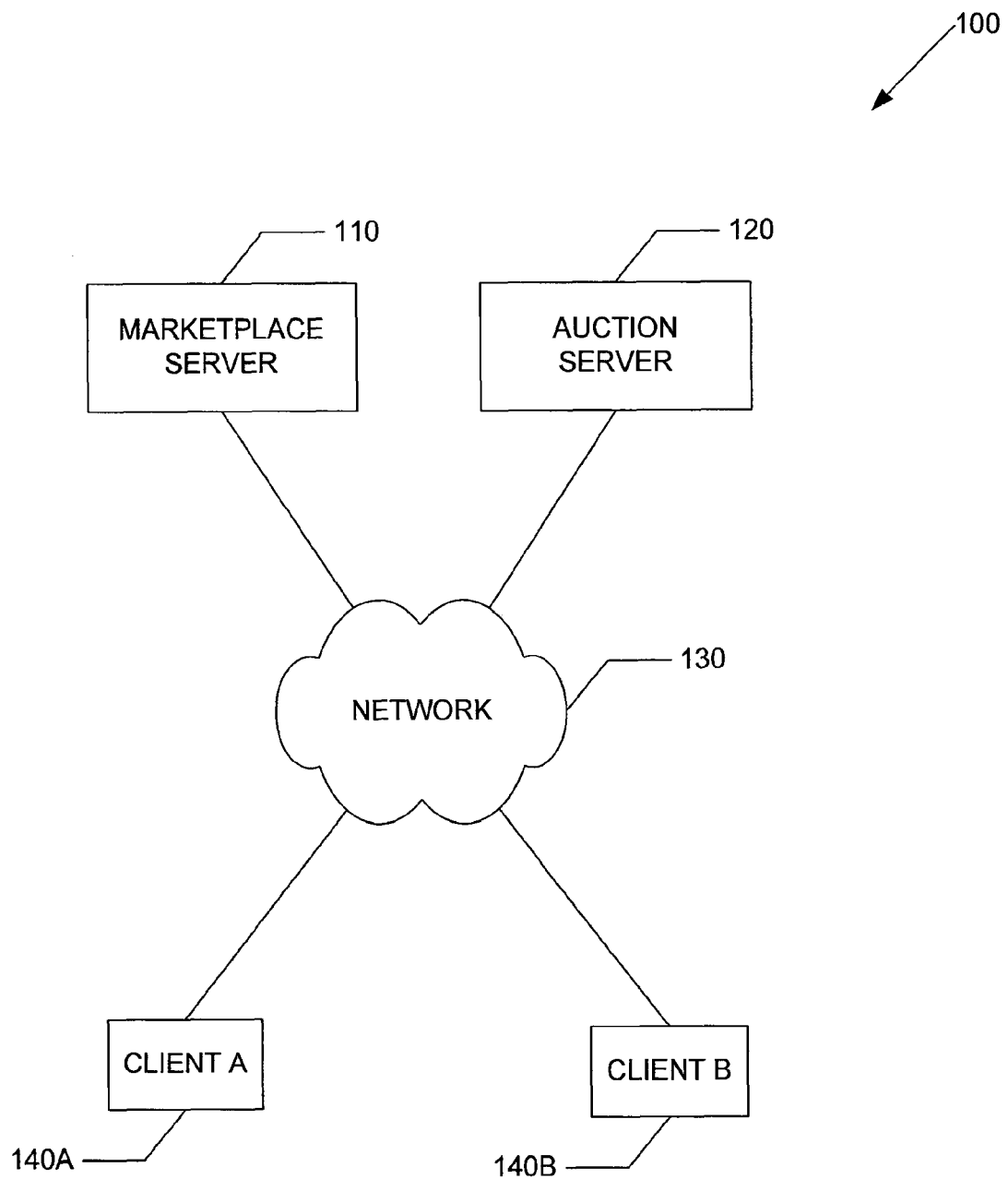
FIG. 1 is a functional block diagram representing an implementation of a system including a marketplace server.

FIG. 1 is a functional block diagram representing an implementation of a system 100 utilizing a marketplace server 110. The system 100 as shown also includes an auction server 120, a network 130, and client devices 140A, 140B.

In one implementation, a client device 140A maintains a digital object. The data comprising the digital object are submitted via the network 130 to the marketplace server 110, where the data are processed in preparation for eventual transfer to a buyer. A buyer operating client device 140B obtains access to a description of the digital object at the marketplace server 110. By browsing and/or searching the description, typically among a plurality of descriptions of other digital objects, the buyer may select the digital object. If the buyer selects the digital object for transfer to the buyer's client device 140B, a transfer request is submitted by the buyer via the client device 140B to the marketplace server 110. The transfer request is processed at the marketplace server 110. In exchange for an agreed-upon payment from the buyer, the data representing the digital object are transferred to the buyer's client device 140B via the network 130.

An auction server 120 supplements the marketplace server 110 for client devices 140A, 140B connected to the marketplace server 110 via the network 130 (e.g., the Internet) so that a digital object may be transferred from client device 140A to client device 140B (e.g., secure sales through auctions). An example of one type of auction server is discussed in U.S. patent application Ser. No. 11/215,227 ("SYSTEM FOR SECURE TRANSFER OF ONLINE PRIVILEGES") filed Aug. 29, 2005, describing apparatus and methods for transferring privileges in a computer system, including implementations supporting secure transfers.

For example, the buyer using client device 140B may browse and/or search the description of the digital object via the auction server 120. The auction server 120 facilitates the sale of the digital object to the buyer, notifies the marketplace server 110, and the marketplace server 110 transfers the data representing the digital object to the buyer's client device 140B via the network 130. Thus, the buyer's interactions using the client device 140B are substantially with the auction server 120, while the marketplace server 110 operates in the background.

Figure 2A:
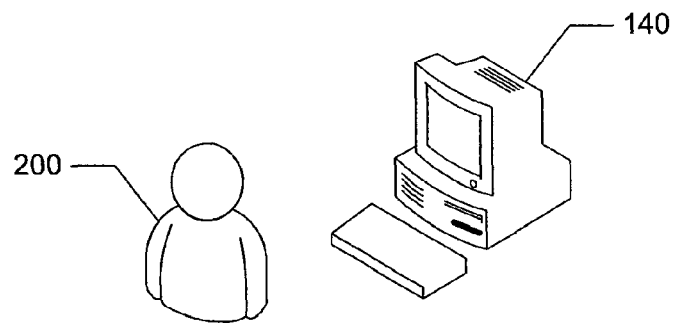
FIG. 2A illustrates a representation of a client device and a user.

FIG. 2A illustrates a representation of a client device 140 and a user 200. The user 200 can use the client device 140 to create, maintain, and submit a digital object to a marketplace server 110 for transfer to another user. The client device 140 may also be used to browse and/or search the description of a digital object, to select the digital object, to facilitate a payment for the digital object, and to receive a transfer of data comprising the digital object from the marketplace server 110.

In one implementation, a digital object includes data used for playing a game on a computer device, personal computer, and game system. Examples of such a system include the PlayStation™ family of game systems offered by Sony Computer Entertainment, Inc. A digital object may be stored as data in persistent storage of a game system, such as a PlayStation 2™ or a PSP™, using a hard disk drive or a removable flash memory device, for example. In another implementation, a digital object includes data used for user-created art or architectural plans.

Figure 2B:
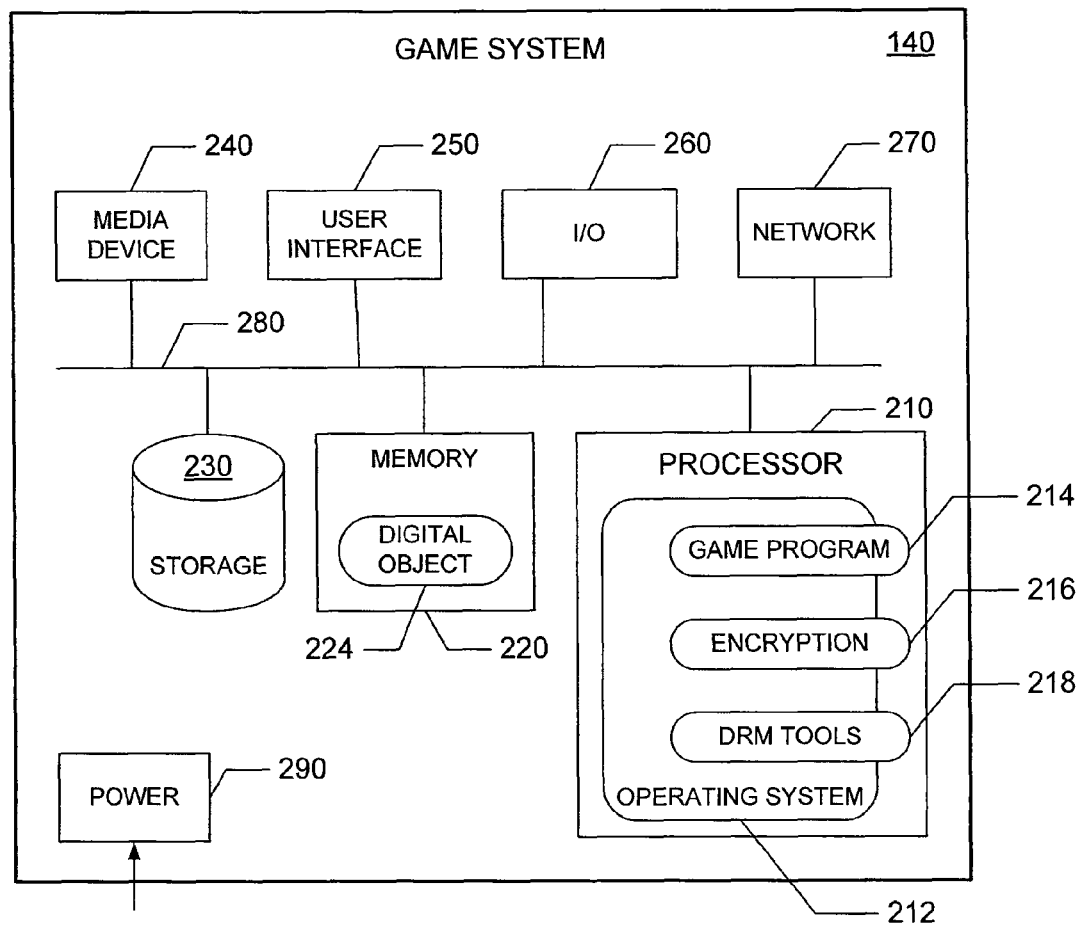
FIG. 2B is a functional block diagram of an example client device.

FIG. 2B is a functional block diagram of an example client device 140. In the example shown, the client device 140 is a game system. In another example (not shown), the client device includes applications that involve non-game related programs such as an art generation or architectural plan program.

The client device 140 includes various hardware and software components supporting the operation of the game system, including a processor 210 (typically comprising one or more programmable processors), memory 220, storage 230, a power module 290, a network interface 270, a user interface 250, and an input/output ("I/O") interface module 260.

The processor 210 controls the operation of the client device 140, and executes computer instructions stored in memory 220, storage 230, or on a media item accessed using the media device 240.

The client device 140 includes an operating system 212 executed by the processor 210, which is typically stored in memory 220 and/or storage 230. The operating system 212 provides various services for the game system, such as network communication, encryption and decryption, and digital rights management ("DRM") tools. Accordingly, as shown in FIG. 2B, the processor 210 operates an encryption module 216 for encryption and decryption services, and a DRM tools module 218, for DRM services. The operating system 212 also provides an interface for the game program 214, such as an application program interface ("API"). An API may be used to request that the operating system 210 assist the game program 214 in securely storing and loading digital objects, for example.

The processor 210 also executes a game program 214, which is typically stored in the storage 230 (e.g., a hard disk), on a media item (e.g., a removable optical disc accessed via the media device 240), or downloaded via the network interface 270.

The memory 220 is used to store data, including data comprising a digital object 224, temporarily for use by the other components of the client device 140. In one implementation, the memory 220 is implemented as RAM. In one implementation, the memory 220 also includes long-term or permanent memory, such as flash memory and/or ROM.

The storage 230 stores data temporarily or over a long term for use by other components of the client device 140. Such data include data stored for used by the game program 214 executed by the processor 210. In one implementation, the storage 230 is a hard disk drive.

The media device 240 receives removable media, and reads and/or writes data to the removable media. In one implementation, for example, the media device 240 is an optical disc drive.

The user interface 250 includes components for accepting input from the user 200 of the client device 140, and for presenting information to the user 200. In one implementation, the user interface 250 includes a keyboard, a mouse, audio speakers, and a display. In another implementation, the user interface 250 includes interface components included by a game system such as one of the PlayStation™ family of game systems offered by Sony Computer Entertainment Inc. The processor 210 uses input from the user 200 to adjust the operation of the client device 140.

The I/O interface 260 manages one or more I/O ports for connecting to corresponding I/O devices such as external storage or supplemental devices (e.g., a printer or a PDA). In one implementation, the ports managed by the I/O interface 260 include USB ports, PCMCIA ports, serial ports, and parallel ports. In another implementation, the I/O interface 260 includes a wireless interface for wireless communication with external devices.

The network interface 270 includes a wired and/or wireless network connection, such as an RJ-45 supporting an Ethernet connection, or a "Wi-Fi" interface including, but not limited to, any of the 802.1X types.

A system communication path 280 (e.g., a system bus) provides for transfers of data and control information between the processor 210, memory 224, storage 230, media device 240, user interface 250, I/O interface 260, and network interface 270.

Figure 3:
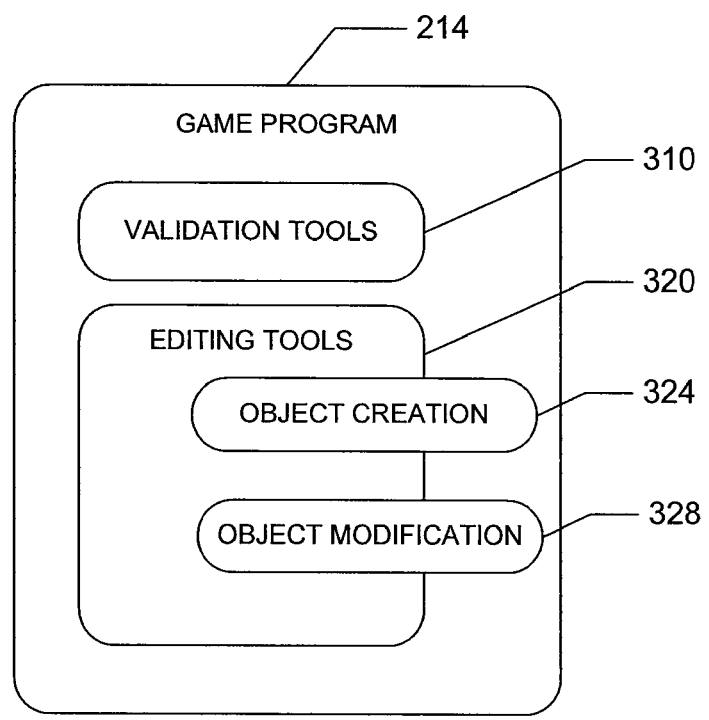
FIG. 3 is a functional block diagram of an example game program.

FIG. 3 is a functional block diagram of an example game program 214. The game program 214 provides a game to be played by a user 200 through execution of the client device 140. In one implementation, the game program 214 uses a digital object 224 in the course of a game play, and includes validation tools 310 for validating data comprising the digital object 224 for compliance with the game program 214. In another implementation, the game program 214 does not include validation tools since the tools should be available in the marketplace server.

In the illustrated implementation, the game program 214 includes digital object editing tools 320. The editing tools 320 may include object creation tools 324 and/or object modification tools 328 for creating and modifying a digital object 224 in compliance with the game. The editing tools 320 and related object creation tool 324 and object modification tool 328 may be implemented as integrated software components, or some or all may be separate software components.

In another implementation, the digital object is used in applications other than in the game program. As discussed above, the digital object can be used in client applications such as an art generation or architectural plan program.

Referring again to FIG. 2B, in one implementation, the client device 140 executes the game program 214 in offline mode, where the operation of the game does not require access to a network or external server. A user may create and edit a new digital object 224, or edit an existing digital object 224, to produce a unique representation of the digital object 224. The digital object 224 thus created is managed by the client device 140 and submitted to a marketplace server 110 for transfer, as discussed below.

In one implementation, a game program 214 is a car racing game stored on an optical disc (such as a Blu-ray Disc ROM). In this implementation, the racing program 214 includes an associated car editing tool ("car editor") 320, referring to FIG. 3. A user 200 may design a new car using the car editor 320 and save the car as a digital object 224. The car editor 320 creates the appropriate data representing the car according to its design, and builds and stores the digital object 224 including those data. The user may also edit an existing car using the car editor 320 and manipulate attributes related to the performance of the car, such as to enhance its power or cornering abilities. Attributes related to the car's appearance may also be adjusted according to preferences of the user 200, and for the purposes of selling and transferring the digital car.

Similarly, editing tools 320 may be provided for designing a race track to be stored as a digital object 224 for use by the user, and for sale and transfer. Also, in the examples relating to a race car and a race track, the digital object 224 thus produced or modified is a "designed item." A designed item may be recreated at any time by the user 200 through the use of the editing tools 320.

In another implementation, a game program 214 is a fantasy role-playing game. The game program 214 may be stored on a media item such as an optical disc, received at the media device 240. A character or item in the role-playing game may be created and maintained in the game program 214 and stored in memory 220 as a digital object 224.

In this implementation, a player controls a character in a fantasy game world, and the character develops successively through game play. The character may acquire items during the game play, and may further modify items within the game. Such items include weapons and armors, for example. A player may also create items in the game. For example, a player may obtain and combine ingredients to make a new item such as a magical potion. In this case, the digital object 224 is a "developed item." A developed item is deemed "unique," and is not necessarily easy for the user to recreate due to the significant amount of game play required to acquire or develop it again. Unlike a designed item, a digital object 224 representing a developed item is typically prevented by the game program 214 from being copied or otherwise replicated. A developed item may also be treated as being unique by the game program 214 to prevent the related digital object 224 from being copied to circumvent game conventions.

A game program 214 may support either, or both, designed items and developed items. Similarly, a game program may treat some or all digital objects 224 of either or both types (i.e., designed items and developed items) as being unique items. It should be noted that, in some implementations, a server process exists to support the game program that keeps track of the objects created and/or used by the client. Thus, the full representation of the object occurs on the server to provide additional security.

For example, in one implementation, developed items are unique items and designed items are not unique items. When a user sells or transfers a developed item to a buyer, the selling user relinquishes access to a usable copy of the item. However, when a user sells or transfers a designed item to a buyer, the selling user retains access to a usable copy of the designed item.

The unique state of some or all digital objects may change. Thus, in one implementation, the indication for "uniqueness" can be set or changed freely by the user or by the game program. In another implementation, the indication for uniqueness may be changed at defined times, such as when the object is created, or when the object is designated for submission to a marketplace server 110.

The game program 214 may work with the operating system 212 of the client device 140 to apply DRM controls to regulate the use and accessibility of unique items. In one example, a title, user ID, and filename are used to manage a DRM key for a digital object 224. Other items of information may also be similarly used.

Software programs for creating other types of digital objects 224 may be used similarly to the game program 214. In one implementation, a computer aided design ("CAD") program is used to create a design for a piece of furniture. Depending on the creating user's intentions, the digital object may be classified as a designed item (e.g., non-unique) or a developed item (e.g., unique). Multiple copies of a designed item such as a bookshelf, for example, may be sold and transferred to multiple buyers. By contrast, a developed item may include an item that is designated by the creating user or the software program as a unique, one-of-a-kind item. The developed item would then become inaccessible to the creating user after transfer to a buyer. It will be appreciated that many other types of digital objects may be similarly designed or developed through the use of appropriate software programs.

A marketplace server 110 is a computer system that includes appropriate computer system components (e.g., hardware and software). One implementation includes one or more programmable processors and corresponding computer system components to store and execute computer instructions stored in memory or on media. The marketplace server 110 further includes software to support a marketplace service allowing users to submit, inspect, and transfer digital objects. The marketplace server 110 may include encryption and decryption tools, DRM tools, a data validation tool, and a data description tool. The tools and software components can be implemented separately, or some or all may be integrated.

Figure 4:
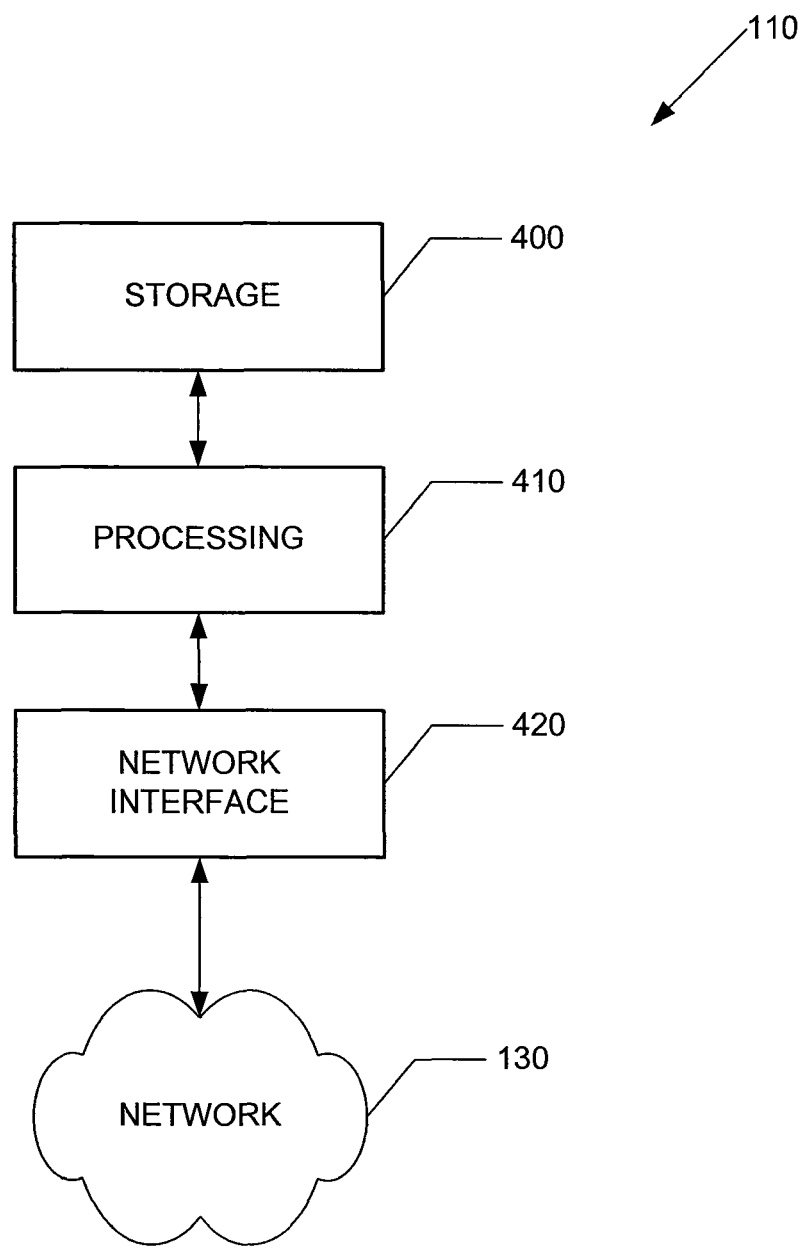
FIG. 4 is a functional block diagram of a marketplace server in accordance with one implementation of the present invention.

FIG. 4 is a functional block diagram of a marketplace server 110. A network interface 420 receives communications from a network 130, such as the Internet, and provides information included in the communications to a processing module 410. The network interface 420 also receives information from the processing module 410 and communicates it over the network 130. The processing module 410 is programmed to perform a plurality of tasks related to transactions involving a digital object including, for example, validation, decryption, building description information, managing DRM information, providing access to description information, transacting exchanges for a digital object, and transferring a digital object. A storage module 400 generally provides persistent storage for digital objects, information related to executing the plurality of example tasks, and software programs.

Figure 5:
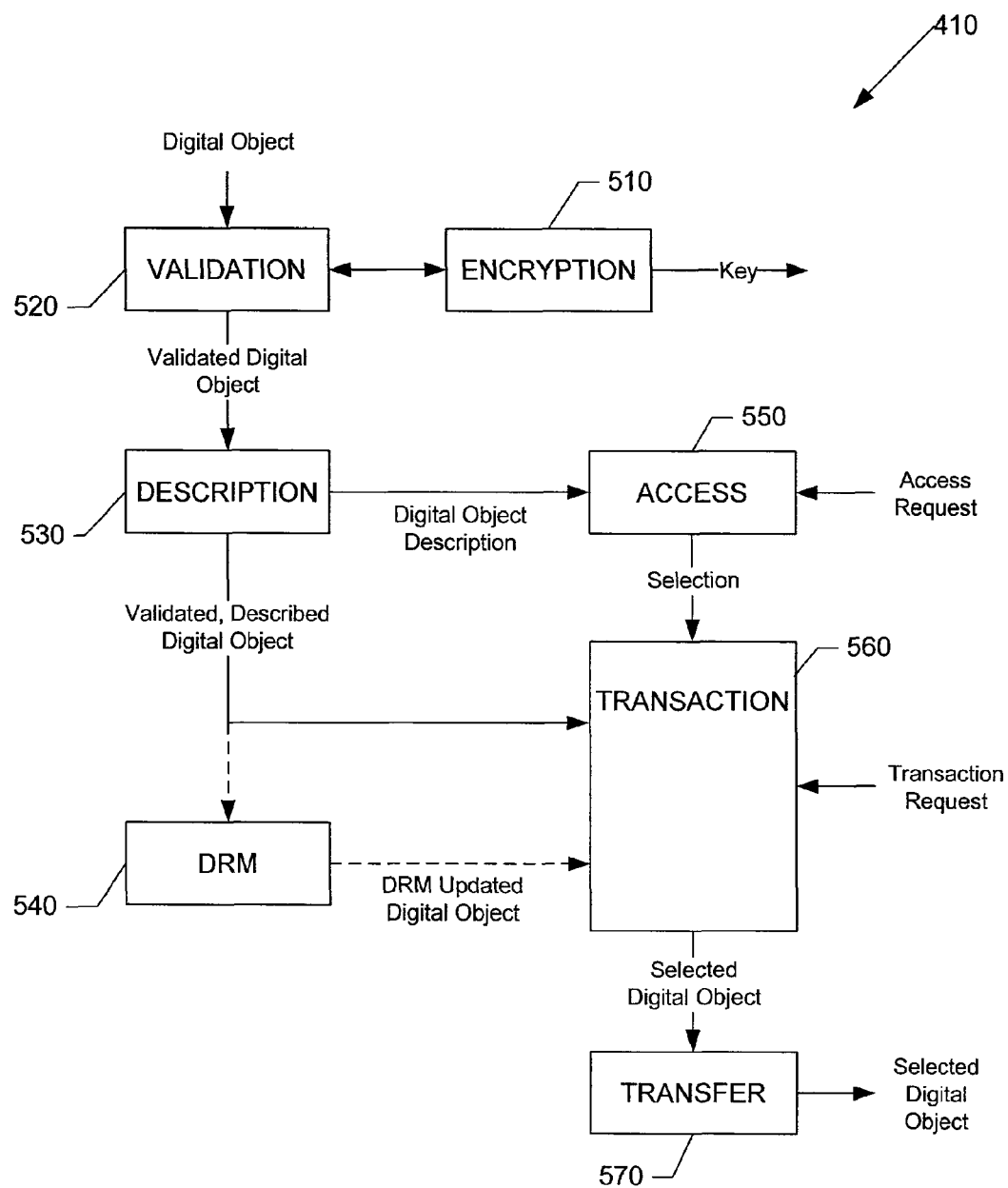
FIG. 5 is a functional block diagram of a processing module within a marketplace server.

FIG. 5 is a functional block diagram of the processing module 410 in a marketplace server 110 according to one implementation. In the illustrated implementation, the processing module 410 includes an encryption module 510, a validation module 520, a description module 530, a DRM module 540, an access module 550, a transaction module 560, and a transfer module 570.

The validation module 520 aids in preparing the digital object for transfer or sale. The validation module 520 receives a digital object and analyzes the data comprising the digital object to ensure conformance with predefined rules relating to the game program 214. In the example of a car racing game program, the data comprising a digital car object received by the validation module 520 are validated to ensure that no performance parameters are out of bounds. For example, a top speed parameter exceeding a predefined limit would allow the user of the digital car object to gain an improper advantage over other users. The validation module 520 may therefore reject the submitted digital car object and prevent it from being offered for sale and transferred. Alternatively, the validation module 520 may adjust the parameter in question to a predetermined, proper value. It will be appreciated that other actions may be taken by the validation module 520 to ensure that the data comprising a digital object conform to predefined rules. Validation may be applied to any data comprising a digital object.

In one implementation, the encryption module 510 decrypts an encrypted digital object. An encrypted digital object is received at the validation module 520, passed to the encryption module 510, and decrypted by the encryption module 510. The decrypted digital object 224 is passed back to the validation module 520 for validation.

Additionally, the encryption module 510 generates an encryption key used to both encrypt and decrypt the digital object. When generated, the encryption key is transmitted to a client device 140. The encryption key is used at the client device 140 to encrypt a digital object 224 (see FIG. 2B) prior to submission for transfer (e.g., for exchange or sale) to the marketplace server 110. Thus, when the encrypted digital object is received at the validation module 520, it is passed to the encryption module 510 and decrypted, as discussed above, using the key.

The description module 530 also prepares the digital object for transfer or sale. The description module 530 receives a validated digital object, and analyzes the data comprising the validated digital object to generate description information. The description information is used to facilitate browsing and/or searching, which results in the selection of the digital object for exchange or purchase by a buyer using the marketplace server 110. The description information may describe any aspect of the digital object.

In one implementation, digital objects are described according to aspects predefined by the marketplace server 100 to ensure that the digital objects are uniformly compared. For example, digital car objects may all be compared on the basis of descriptions of power, cornering ability, speed, stopping power, and an image of the digital object. In another implementation, aspects for which description information may be determined are indicated by the creator of the digital object to enhance salability.

The access module 550 receives description information associated with a digital objects from the description module 530, and presents the retrieved description information for browsing and/or searching by a buyer.

Accordingly, the access module 550 receives a request for access to description information of digital objects that are available for transfer at the marketplace server 110. For example, a potential buyer submits a request to browse or search through a collection of available digital objects. In one implementation, the buyer may also request recommendation information to aid searching for digital objects of interest. Typically, the buyer interacts with the marketplace server 110 using a client device 140, as discussed above.

Accessing the description information, the buyer may select a digital object of interest for which a transfer is desired, and then request a transaction for the transfer of that digital object. The transaction module 560 receives the transaction request, and may facilitate the transaction with various forms of exchange. For example, real currency, or online items, such as points in a digital wallet, might be provided in exchange for the digital object. The transactions are typically implemented using secure methods for the exchange.

The transaction module 560 may perform the described tasks internally, or in an implementation, offload certain tasks to an external server. In one implementation, a simple transaction system is used, where a buyer agrees to meet an indicated price or exchange. In another implementation, an auction system, as discussed in U.S. patent application Ser. No. 11/215,227 (referenced above), is used to facilitate an agreement over price or exchange.

When payment has been received from the buyer at the transaction module 560 for the digital object, the transfer module 570 receives data comprising the selected digital object and transfers the selected digital object to the buyer.

Optionally, a DRM module 540 receives a validated, described digital object and updates DRM information (e.g., an entitlement) for it in preparation for transfer or sale. For example, DRM information may be used to restrict copying where a unique digital object (e.g., a developed item) should not be copied or used by more than one user at a time. In one implementation, the DRM module 540 writes the DRM updated digital object to a transaction module 560, as discussed above. In another implementation, the DRM module 540 writes the DRM updated digital object to persistent storage for later retrieval.

In FIGS. 6A, 6B, and 7-10, various actions and events are represented by labeled blocks, as described below. In addition, the blocks are positioned in columns to reflect which component or party is taking the action. In FIGS. 6A, 6B, and 7-9, columns labeled "GAME PROGRAM" and "ENCRYPTION TOOL" are grouped under the heading of "GAME SYSTEM" to indicate that the game program and encryption tool are both executed within the environment of the game system.

Figure 6A:
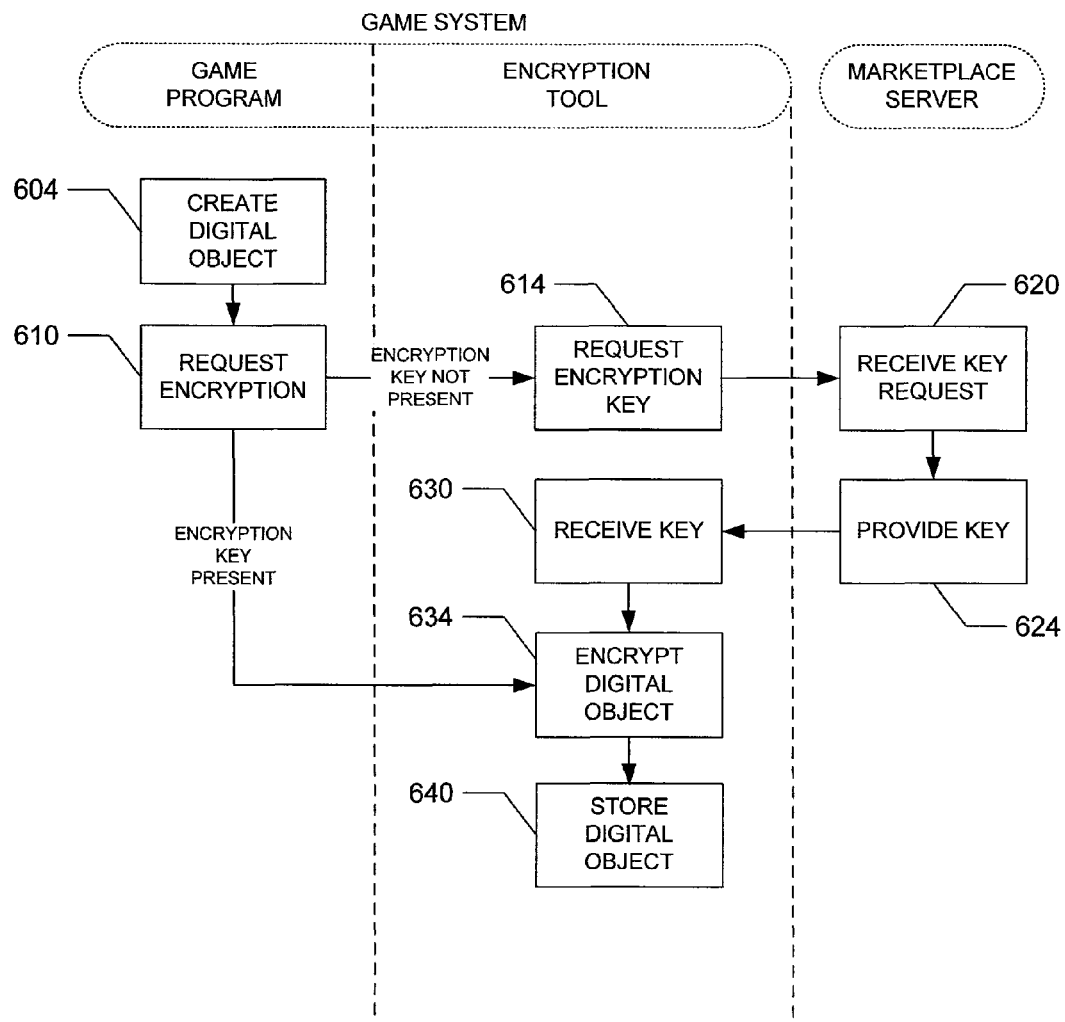
FIG. 6A is a flowchart for creating, encrypting, and storing a digital object on a client device in accordance with one implementation of the present invention.

FIG. 6A is a flowchart for creating, encrypting, and storing a digital object on a client device. In the illustrated implementation, a user creates a digital object, at block 604, for a game program executed on a game system. When the digital object is to be stored, the game program requests encryption of the digital object, at block 610. The request is made to an encryption tool, which may be a component of the game system's operating system, or an independently executing program. Alternatively, an independently executing digital object editing tool being used instead of, or in conjunction with, the game program may request encryption.

If an encryption key is not present, the encryption tool requests a key from the marketplace server, at block 614, through a network connection or session opened by the game system and maintained by the operating system. The marketplace server receives the key request, at block 620, and provides a key to the game system, at block 624. The encryption tool receives the key, at block 630, encrypts the digital object, at block 634, and stores the encrypted object, at block 640, in storage associated with the game system.

Alternatively, when the game program requests encryption of the digital object, at block 620, by the encryption tool, an encryption key may already be present. If so, the encryption tool therefore does not need to obtain a key externally. The encryption tool encrypts the digital object, at block 634, and stores it, at block 640, in storage associated with the game system.

Figure 6B:
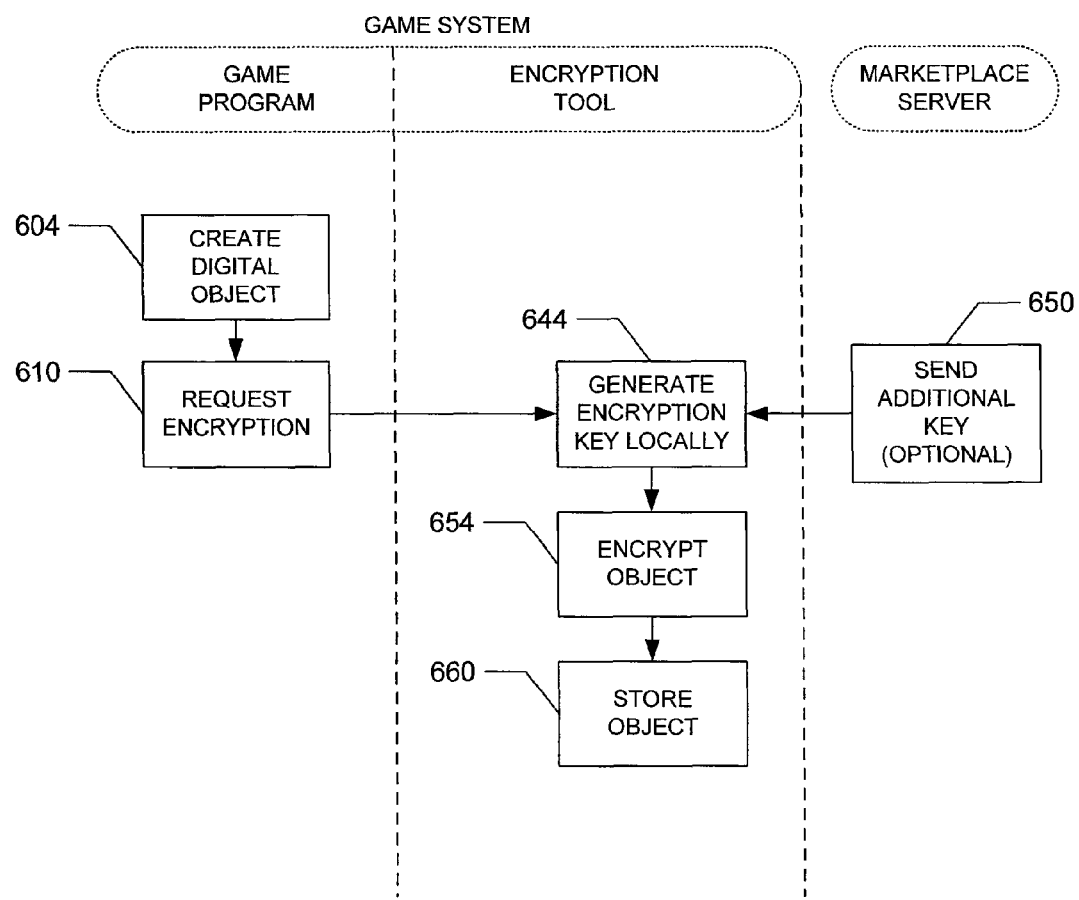
FIG. 6B is a flowchart for creating, encrypting using a locally generated key, and storing a digital object on a client device in accordance with one implementation of the present invention.

FIG. 6B is a flowchart for creating, encrypting using a locally generated key, and storing a digital object on a client device in accordance with one implementation. In the illustrated implementation, an encryption key is generated locally by the game system rather than, or in addition to, requesting a key from the marketplace server. In one example, the key is generated locally by incorporating a unique hardware identifier of the game system and a unique identifier of the game program. In this case, when a digital object is submitted to a marketplace server for sale or transfer, the digital object may be re-encrypted using a new key generated or obtained by the marketplace server. Such re-encrypting may be performed, for example, to facilitate transfer of the digital object to a different type of game system.

As shown in FIG. 6B, a user creates a digital object, at block 604, for a particular game program executed on a game system. When the digital object is to be subsequently stored, the game program requests encryption of the digital object, at block 610. The request is made to an encryption tool, which may be a component of the game system operating system, or an independently executing program. Alternatively, an independently executing digital object editing tool being used instead of, or in conjunction with, the game program may request encryption.

The encryption tool generates a key locally, at block 644. Optionally, the marketplace server may send an additional key, or additional key-related data, to the encryption tool, at block 650, to supplement local generation of the key, at block 644. The encryption tool encrypts the digital object, at block 654, and stores the encrypted object, at block 660, in storage associated with the game system.

Figure 7:
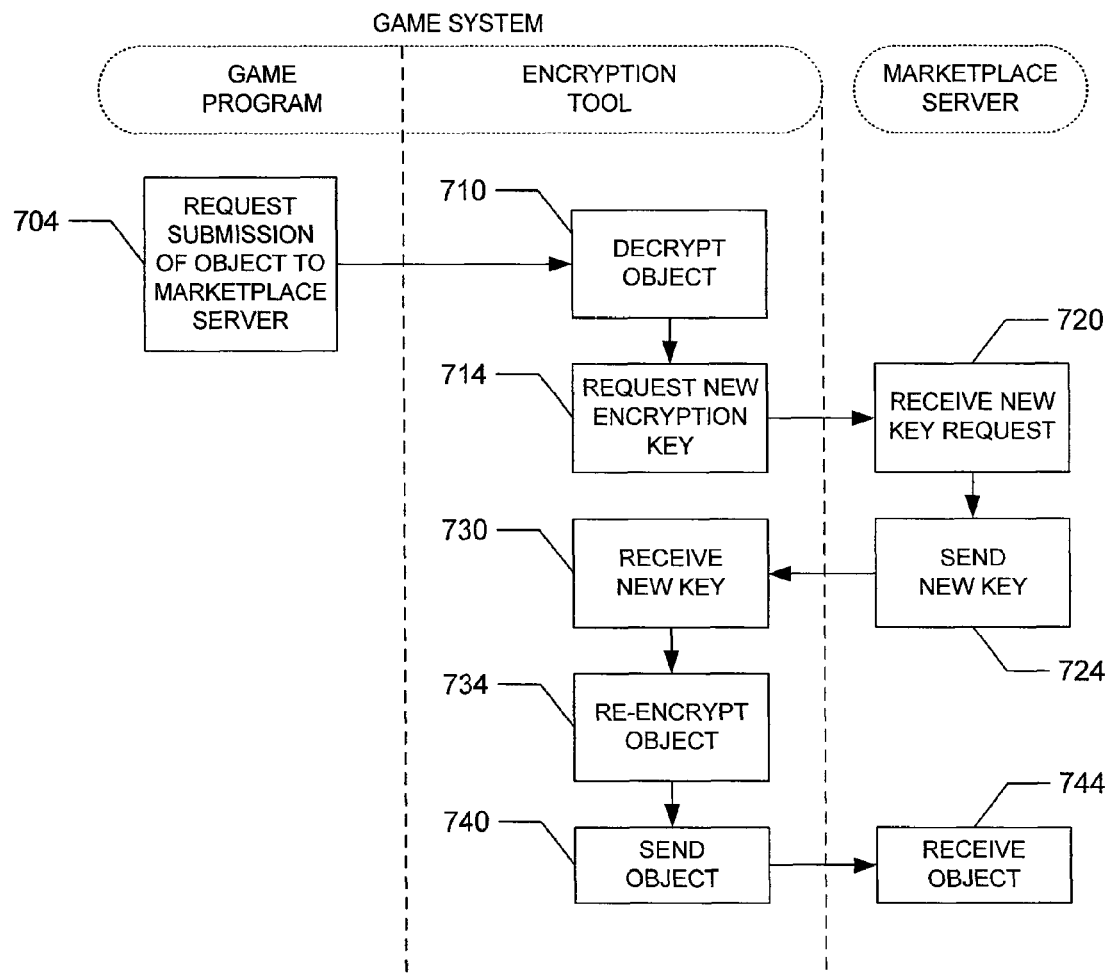
FIG. 7 is a flowchart for transferring a digital object from a client device to a marketplace server.

FIG. 7 is a flowchart for transferring a digital object from a client device to a marketplace server. As discussed above, when the encryption key is generated locally, the marketplace server may require re-encryption of the digital object so that it is compatible, for example, with other types of game systems. Initially, the game program generates a request, at block 704, to submit a digital object to the marketplace server. The encryption tool at the game system decrypts the digital object, at block 710, using the locally generated encryption key. The encryption tool then requests a new encryption key, at block 714, from the marketplace server. The marketplace server receives the request, at block 720, and sends a new key, at block 724. The encryption tool receives the new key, at block 730, and re-encrypts the digital object using the new key, at block 734. The encryption tool sends the data comprising the encrypted digital object to the marketplace server, at block 740, where it is received, at block 744. Communications between the game server (e.g., the game program and encryption tool) and the marketplace server are facilitated using communication resources of the game system.

Figure 8:
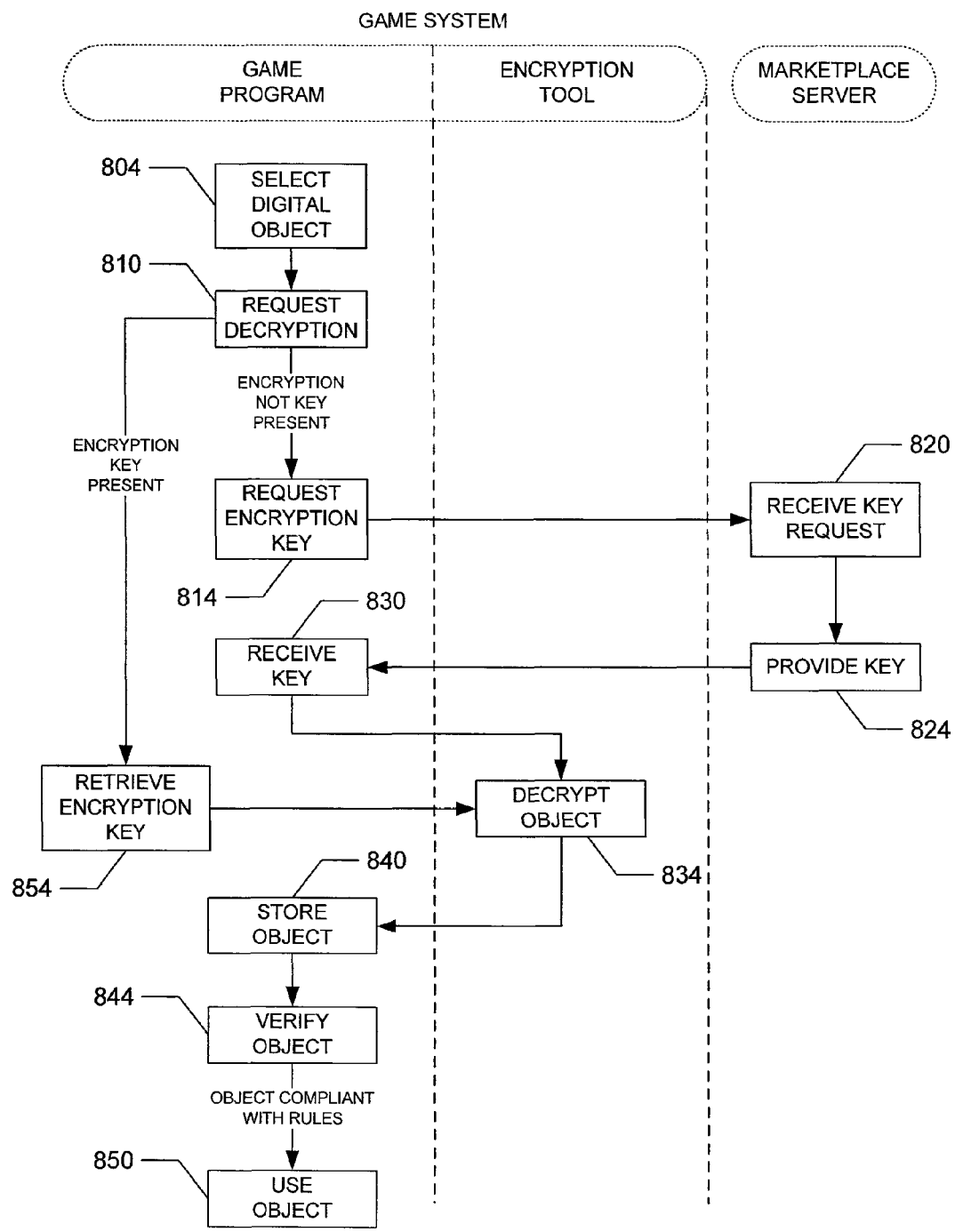
FIG. 8 is a flowchart for using a digital object on a client device.

FIG. 8 is a flowchart for using a digital object on a client device. As shown, when the user wishes to use a digital object, the user selects the digital object using the game program, at block 804. The game program then requests that the encryption tool decrypt the digital object, at block 810. As discussed above, the encryption tool may be a component of the operating system of the game system, or it may be an independently executing program.

If the key is not present, the game program requests the encryption key from the marketplace server, at block 814. As shown, the request is sent to the marketplace server, using communication resources of the game system. The request for the key is received, at block 820, at the marketplace server. The marketplace server provides the key, at block 824, by sending it to the game program. The key is received, at block 830, at the game program via the operating system, and the used by the encryption tool to decrypt the object, at block 834.

If an encryption key is present, the decryption tool retrieves the key from memory or storage, at block 854. The retrieved key may be a key received previously from the marketplace server, such as discussed in relation to FIG. 6A, at block 630. The encryption tool uses the key to decrypt the digital object, at block 834. After decryption, the game system stores the decrypted digital object in memory, at block 840.

The game program then verifies the data of the digital object, at block 844, for compliance with one or more rules defined by the game program for compliant digital objects. If the data of the digital object are compliant, then the game program allows the use of the digital object for game play, at block 850, which play ensues as directed by the user in the course of game program execution.

Figure 9:
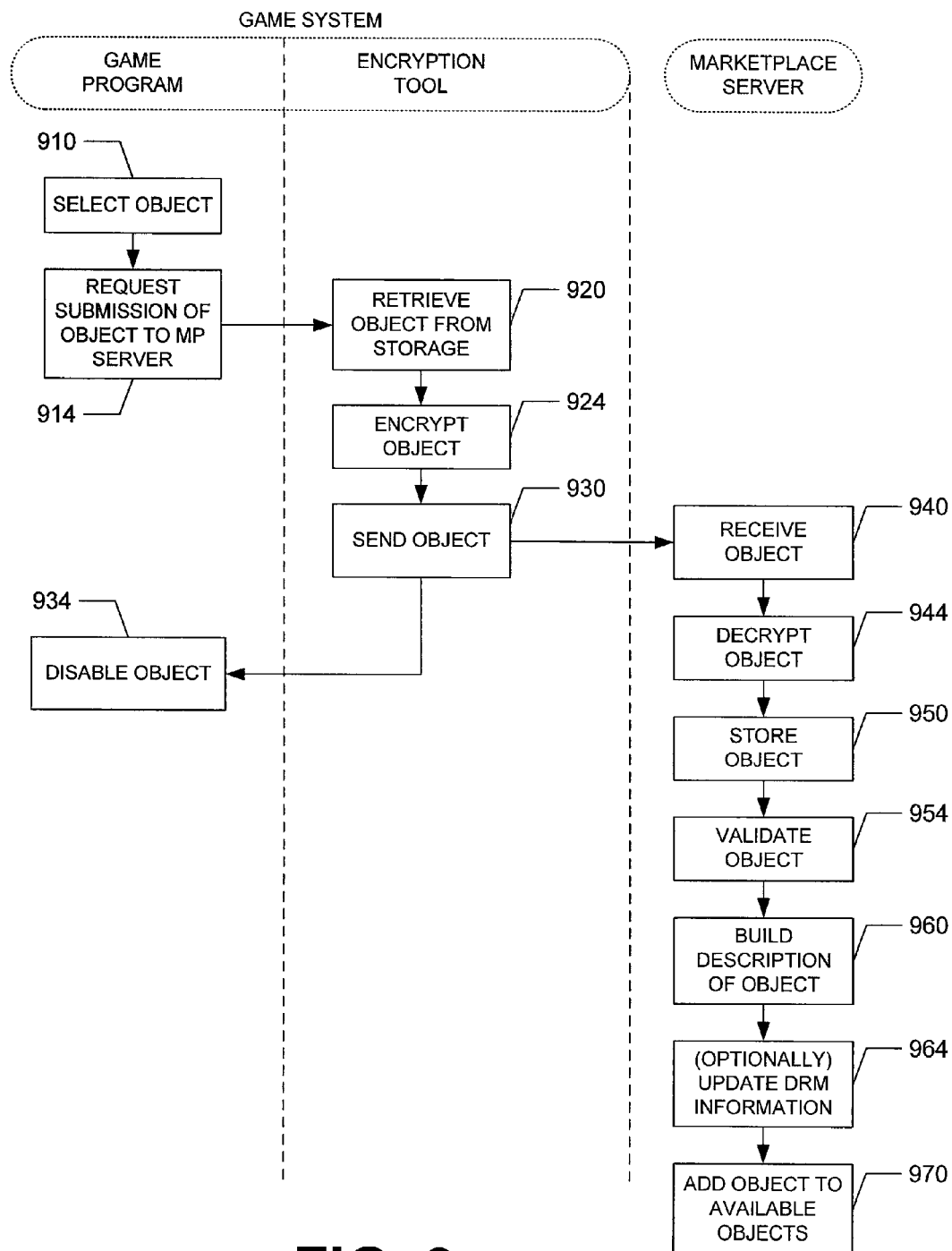
FIG. 9 is a flowchart for sending a digital object from a client device to a marketplace server.

FIG. 9 is a flowchart for submitting a digital object at a client device (e.g., a game system) to a marketplace server. Such a submission occurs when a user wishes to transfer a digital object to sell it through the marketplace server.

Using the game system, the user selects the digital object to be submitted to the marketplace server, at block 910. The user submits the digital object to the marketplace server by requesting that the game system send the digital object to the marketplace server (e.g., making the request through the game program, or through the operating system of the game system). A request to submit the digital object is generated at the game program, at block 914. The encryption tool, retrieves the selected digital object from storage, at block 920. The encryption tool is typically a component of the operating system, but it may also be a separately executing program, or it may even be a part of the game program. The digital object is encrypted, at block 924, if required, and a copy of the encrypted digital object is sent to the marketplace server, at block 930. The marketplace server receives the digital object, at block 940, decrypts the digital object using an appropriate key, at block 944, and stores the decrypted data, at block 950.

The data of the digital object are validated, at block 954. The marketplace server uses a validation tool to validate the data of the digital object to confirm that the data comply with rules corresponding to the digital object. In one implementation, a validation tool is provided by the developer of the game program for which the digital object is to be used. The marketplace server provider is thus not required to develop separate validation tools for each application program using digital objects for which transfers via the marketplace server are desired. In another implementation, the game developer hosts a service accessible by the marketplace server that enables the marketplace server to send the digital object through a secure connection and receive confirmation that the object is valid.

A description of the digital object is built, at block 960. However, the building of the description is optional. Description information thus generated is used to facilitate browsing, searching, and selection of the digital object for exchange or purchase by a buyer using the marketplace server. The marketplace server may use a description tool to build the description. As with the validation tool, in one implementation, the description tool is provided by the developer of the game program for which the digital object, as the game program developer may best describe the data comprising the digital object.

Validating the digital object, at block 954, and building a description of the digital object, at block 960, prepare the digital object for transfer or sale. In one implementation, the validation and/or description tools are provided by a third party, or directly by the marketplace server. In another implementation, the validation and/or description tools are provided by the game system (i.e., the client device). In one such implementation, validation rules and digital objects are created according to defined formats so that the game system's tools (or the marketplace server's tools) may process the data comprising the digital objects. The validation and/or description tools may also accept information from the game program to ascertain specific compliance requirements. In one such implementation, the data that reside on the client are assumed protected, and neither data validation nor encryption are required.

In one implementation, the marketplace server may optionally update DRM information, at block 964, for the digital object if appropriate to prepare the object for transfer or sale, or upon transfer of the object. DRM information typically controls an aspect of digital object ownership, such as an entitlement. Thus, for example, a unique object that should not be copied or used by more than one user at a time will require the use of DRM information. Such a digital object would be a developed item, as discussed above.

In one implementation, the DRM control is managed by the marketplace server, or another network server. The game system must therefore have access to the appropriate server through a network in order to make use of the DRM controlled digital object.

In another implementation, all digital objects are used with DRM controls, requiring the marketplace server to always update the DRM information when receiving and transferring a digital object. In another implementation, DRM is not required because the digital object is assumed to be protected on the client device (e.g., game system).

Once the digital object is ready for transfer or sale, the marketplace server adds the object to a collection of objects available on the marketplace server, at block 970. In one implementation, availability of the collection of digital objects is through an auction interface.

Figure 10:
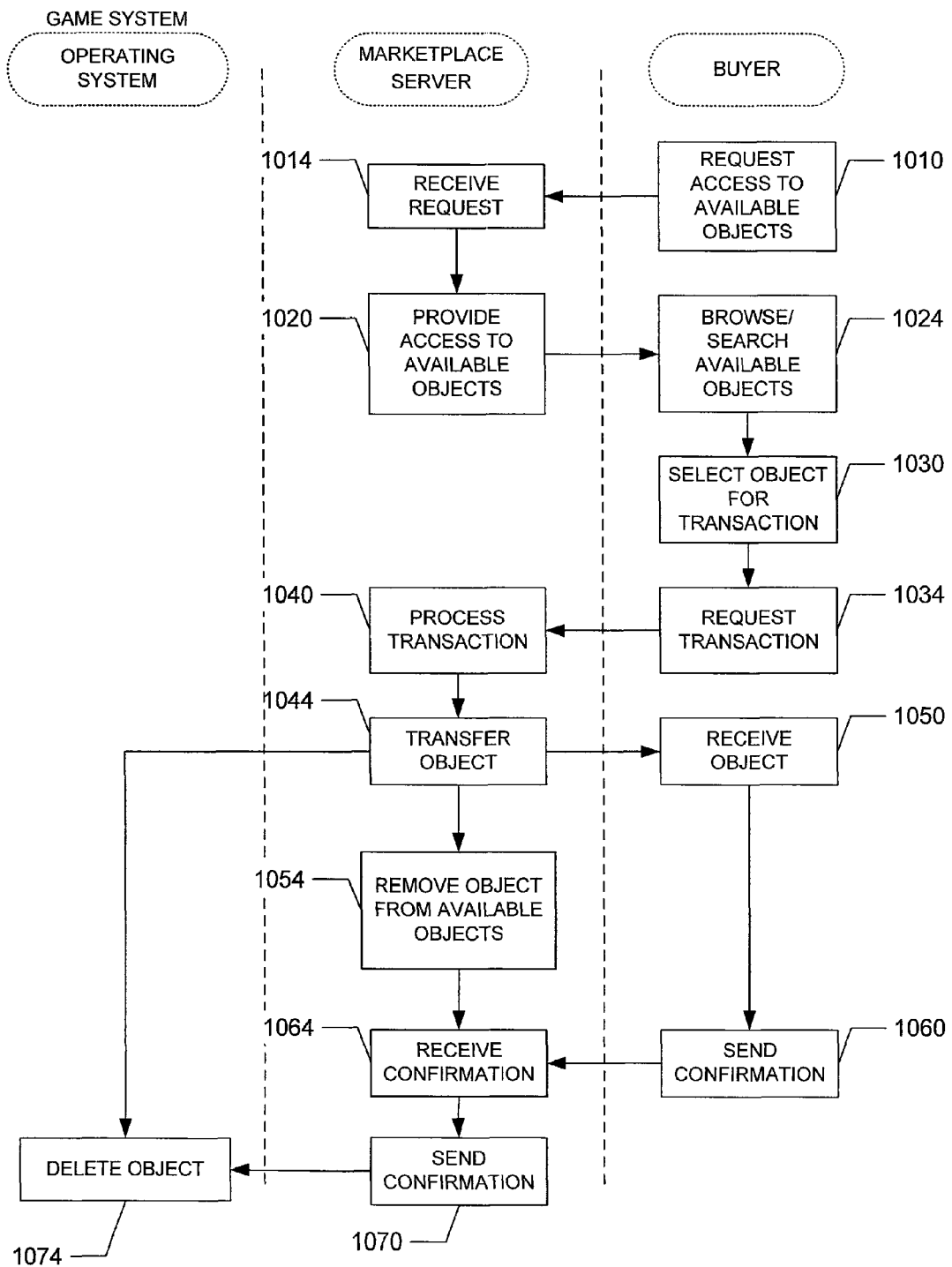
FIG. 10 is a flowchart for transacting a transfer of a digital object from a marketplace server to a buyer.

FIG. 10 is a flowchart for transacting a transfer of a digital object from a marketplace server to a buyer. Using a client device, a buyer accesses the marketplace server (or, in another implementation, an auction server) and views the descriptions of the digital objects of the collection in order to select a digital object of interest. The buyer requests access to the available objects in the collection of digital objects, at block 1010. The request is received at the marketplace server, at block 1014, and access is provided, at block 1020.

The buyer browses the available digital objects, at block 1024, implemented with browsing, searching, and/or recommendation facilities at the marketplace server (or the auction server). The buyer selects a digital object of interest, at block 1030. The buyer may then request a transaction, at block 1034, such as a transfer, exchange, or purchase of the selected digital object.

The marketplace server processes the transaction, at block 1040. The marketplace server may facilitate a transaction involving various forms of consideration or exchange including, for example, real currency, or online items, such as points in a digital wallet. In one implementation, a simple transaction system is used, where a buyer and seller agree to meet an indicated price or exchange. In another implementation, an auction system, as discussed in U.S. patent application Ser. No. 11/215,227 (referenced above), is used to facilitate an agreement over price or exchange. The transactions are typically implemented using secure methods for the exchange.

The marketplace server transfers the data comprising the digital object, at block 1044, to the buyer. It will be appreciated that various techniques for effecting the transfer over a network connection may be used.

Once the transfer to the buyer, at block 1044, is completed, the digital object may removed from the collection of available objects, at block 1054. Such removal may be required when the digital object is a developed item (e.g., it is unique). Thus, the digital object is no longer available, and its uniqueness is preserved. If the digital object is instead a designed item (e.g., non-unique), it may typically not be removed because multiple copies are allowed to be distributed to buyers.

In one implementation, once the transfer to the buyer, at block 1044, is completed for a digital object that is a developed item, the digital object is also deleted from memory and/or storage at the seller's game system, at block 1074. The buyer receives the digital object, at block 1050, and sends a confirmation, at block 1060, which is received at the marketplace server, at block 1064. Upon receipt of the confirmation (at block 1064) that the buyer has received the digital object, a further confirmation is sent from the marketplace server to the game system, at block 1070. When the digital object is a developed item, the operating system deletes the digital object from memory and/or storage on the game system.

In one implementation, referring to FIG. 9, the game system disables a digital object, at block 934, after the digital object is submitted to the marketplace server, at block 930. As discussed above, designed items (non-unique) are not disabled on submission while developed items (unique) are. In some implementations, digital objects that are designed items may also, or instead, be disabled depending upon rules defined by the game.

Various techniques may be used to disable the object. These include, for example, setting a flag in the data of the digital object, or adding an identifier indicating the digital object to be disabled to a list of disabled digital objects (applicable where an application program confirms that an object is not disabled before allowing it to be used). Information controlling the disablement status of an object (e.g., flag status, or the disabled list) may be stored locally or on a network server, such as a marketplace server or game server. If a digital object is submitted to a marketplace server, but later returned to the game system from which it was submitted, the operating system of that game system enables the digital object once again for use on that game system.

The various implementations of the invention are realized in electronic hardware, computer software, or combinations of these technologies. Some implementations include one or more computer programs executed by a programmable processor or computer. For example, referring to FIG. 1, in one implementation, the marketplace server and the auction server each include one or more programmable processors. In general, each computer also includes one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. In one example, non-unique digital objects are stored unencrypted, or remain unencrypted until submitted to the marketplace server. In another example, digital objects are for use with the operating system of the client device instead of, or in addition to, use with a particular application (i.e., game) program executed by the client device.

In addition, while the above examples focus on game applications and game systems, other systems and types of data and programs can be used as well as in different client-server architectures (e.g., digital objects storing music or video). Similarly, while the above examples focus on digital objects created, stored, and managed by a client device, the digital objects may be created, stored, and/or managed by one or more network servers, or in combination with one or more local systems (e.g., according to a peer-to-peer model). For example, an online game could have digital objects created and managed by a game server, used by a game client and the game server in conjunction for game play, and submitted by the game server to the marketplace server for sales or transfers.

Accordingly, the present invention is not limited to only those implementations described above.

What is claimed is:

1. A computer-implemented method of transferring a digital object from a first client device to a second client device in an electronic game, comprising:
   creating a digital object on the first client device, the first client device designating the digital object as one of at least two types: a designed item type and a developed item type,
   wherein the designed item type is used to make multiple copies of the digital object,
   wherein the developed item type is built by developing the digital object through a series of modifications during game play, and is unique because only one copy of the digital object is generated, and
   wherein the type of digital object is interchangeable;
   generating an encryption key on the first client device;
   encrypting the digital object on the first client device using the encryption key,
   wherein the encrypted digital object is stored locally on the first client device;
   receiving from the first client device the digital object;
   validating at a server the received digital object according to predefined rules,
   wherein said validating includes analyzing and testing data comprising the received digital object to ensure conformance with the predefined rules and that no parameters are outside of predefined limits for performance of the digital object in the electronic game;
   adjusting the digital object to conform with the predefined rules when the digital object does not conform with the predefined rules after said validating;
   building at a server a description of the validated digital object;
   providing to the second client device an access to the description to select the validated, described digital object for transfer; and
   transferring the validated, described digital object to the second client device.

2. The method of claim 1, wherein the digital object comprises
   a game object used in a game program.

3. The method of claim 2, further comprising
   validating the game object for compliance with the game program using validation tools.

4. The method of claim 1, wherein said providing access to the description includes facilitating a search for the description.

5. The method of claim 1, further comprising
   transacting an exchange for the validated, described digital object using an auction server which communicates with the server to auction and transfer the transacted digital object from the first client device to the second client device when the second client device obtains the digital object in auction.

6. The method of claim 5, wherein said transacting an exchange includes:
   determining a payment in exchange for the validated, described digital object; and
   facilitating a transfer of the payment.

7. The method of claim 1, wherein said transferring the validated, described digital object of the designed item type includes
   transferring each of the multiple copies of the digital object separately to different buyers.

8. The method of claim 7, further comprising
   disabling a copy of the digital object on the first client device upon said receiving the digital object.

9. The method of claim 7, further comprising
   deleting a copy of the digital object from a memory of the first client device upon said transferring the validated, described digital object to the second client device.

10. The method of claim 1, further comprising
    updating digital rights management information relating to the digital object.

11. The method of claim 1, wherein the digital object is a digital car object and the predefined rules ensure that no performance parameters for the digital car object are out of bounds.

12. A non-transitory computer-readable storage medium storing a computer program for use in transferring a digital object in an electronic game, the program comprising:

an editor to create a digital object designated as one of at least two types: a designed item type and a developed item type,
wherein the designed item type is used to make multiple copies of the digital object,
wherein the developed item type is built by developing the digital object through a series of modifications during game play, and is unique because only one copy of the digital object is generated, and
wherein the type of digital object is interchangeable,
wherein the editor configured to generate an encryption key, the editor including an encryption module to encrypt the digital object using the encryption key, and to store the encrypted digital object locally on the non-transitory computer-readable storage medium;
a validation module to validate a digital object according to predefined rules,
wherein the validation module analyzes and tests data comprising the digital object to ensure conformance with the predefined rules and that no parameters are outside of predefined limits for performance of the digital object in the electronic game;
adjusting the digital object to conform with the predefined rules when the digital object does not conform with the predefined rules after said validating;
a description module to build a description of the validated digital object;
an access module providing access to the description of the digital object to select the validated, described digital object for transfer; and
a transfer module to transfer the validated, described digital object.

13. The non-transitory computer-readable storage medium of claim 12, wherein:
the validation module receives the digital object from a first client device; and
the transfer module transfers the validated, described digital object to a second client device.

14. The non-transitory computer-readable storage medium of claim 13, further comprising an encryption module to:
generate an encryption key; and
decrypt the digital object.

15. The non-transitory computer-readable storage medium of claim 14, wherein the encryption key is used to encrypt the digital object at the first client device.

16. The non-transitory computer-readable storage medium of claim 12, further comprising
a digital rights management ("DRM") module to update DRM information of the digital object.

17. The non-transitory computer-readable storage medium of claim 12, further comprising
a transaction module to facilitate an exchange for the validated, described digital object.

18. A non-transitory computer-readable storage medium storing a computer program for use in transferring a digital object in an electronic game, the program comprising executable instructions that cause a computer to:
create a digital object designated as one of at least two types: a designed item type and a developed item type,
wherein the designed item type is used to make multiple copies of the digital object,
wherein the developed item type is built by developing the digital object through a series of modifications during game play, and is unique because only one copy of the digital object is generated, and
wherein the type of digital object is interchangeable;
generate an encryption key;
encrypting the digital object using the encryption key,
wherein the encrypted digital object is stored locally on the non-transitory computer-readable storage medium;
receive the digital object;
validate the digital object according to predefined rules,
wherein executable instructions that cause the computer to validate include executable instructions that cause the computer to analyze and test data comprising the received digital object to ensure conformance with the predefined rules and that no parameters are outside of predefined limits for performance of the digital object in the electronic game;
adjusting the digital object to conform with the predefined rules when the digital object does not conform with the predefined rules after said validating;
build a description of the validated digital object;
provide access to the description to select the validated, described digital object for transfer; and
transfer the validated, described digital object.

19. The computer program of claim 18, wherein:
the digital object is received from a first client device; and
the validated, described digital object is transferred to a second client device.

20. The computer program of claim 18, wherein the executable instructions that cause a computer to transfer the validated, described digital object of the designed item type includes
executable instructions that cause a computer to transfer each of the multiple copies of the digital object separately to different buyers.

21. The computer program of claim 20, wherein a copy of the digital object is disabled on the first client device when the digital object is received.

22. The computer program of claim 20, wherein a copy of the digital object is deleted from a memory of the first client device when the validated, described digital object is transferred.

23. The computer program of claim 18, wherein the program further comprises executable instructions that cause a computer to:
determine a payment amount; and
facilitate a transfer of the payment amount from the user.

* * * * *